Feb. 21, 1950 W. J. BOYLE 2,498,392
ADJUSTABLE MOTOR BASE
Filed Feb. 6, 1947
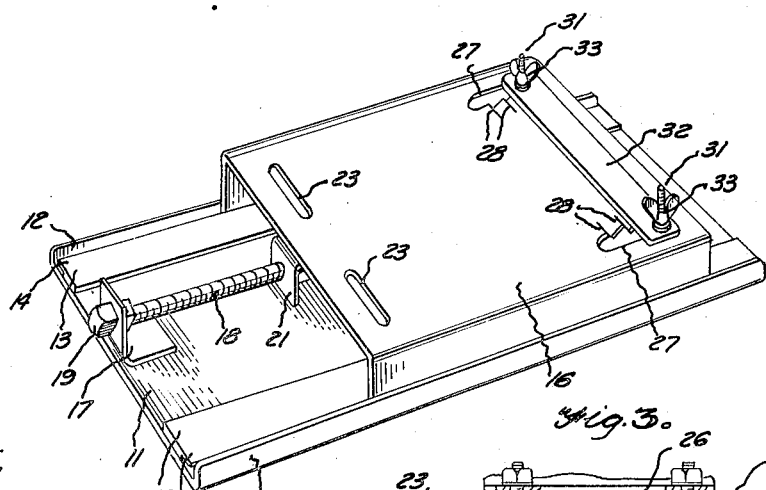
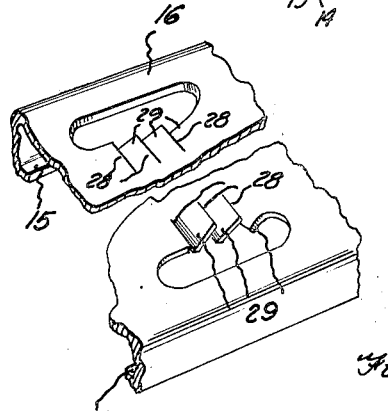
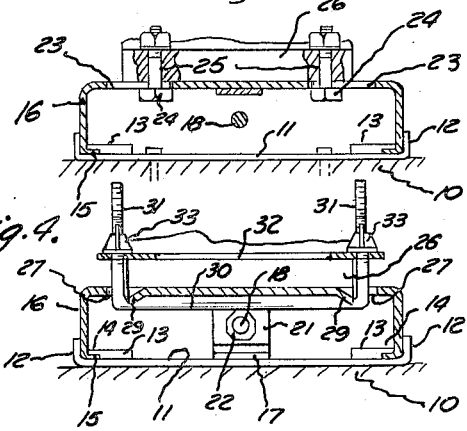
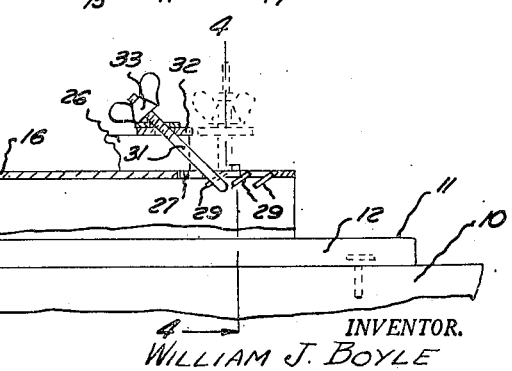
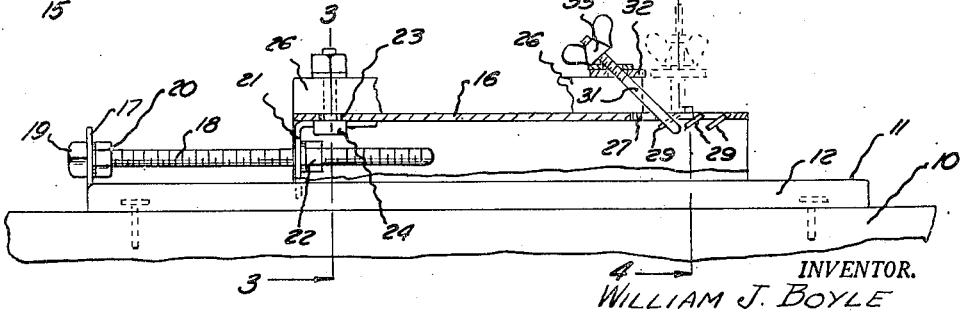
INVENTOR.
WILLIAM J. BOYLE
BY
HIS ATTY.

Patented Feb. 21, 1950

2,498,392

UNITED STATES PATENT OFFICE 2,498,392

ADJUSTABLE MOTOR BASE

William J. Boyle, St. Louis, Mo.

Application February 6, 1947, Serial No. 726,844

4 Claims. (Cl. 248—23)

This invention relates to an adjustable motor base, and has for one of its objects the production of a simple and efficient motor base which may be adjusted to clamp motors of various sizes firmly in position upon the adjustable motor base.

A further object of this invention is the production of a simple and efficient means for attaching a motor to the adjustable motor base by means of a U-bolt clamp which may be swung to selected clamping positions.

Other objects and advantages of this invention will appear throughout the following specification and claims.

In the drawing:

Figure 1 is a perspective view of the adjustable motor base;

Figure 2 is a side elevational view, partly in longitudinal section;

Figure 3 is a vertical sectional view taken on line 3—3 of Figure 2;

Figure 4 is an irregular vertical sectional view taken on line 4—4 of Figure 2, and showing the U-bolt clamp in a vertical position;

Figure 5 is a fragmentary sectional perspective view of the motor-supporting casing.

By referring to the drawing, it will be seen that 10 designates a suitable support upon which the adjustable motor base is anchored in any conventional manner. The adjustable motor base comprises a bottom tray-like member 11 having upstanding parallel side flanges 12. A pair of longitudinally extending track-ways 13 are secured to the upper face of the member 11 and are provided with overhanging flanges 14 which are spaced from the flanges 12 and spaced from the upper face of the member 11 to provide track channels for receiving the inturned flanges 15 of the motor-supporting casing 16.

The casing 16 extends above the member 11 and is slidable longitudinally of the member 11. An upstanding bracket 17 is secured to one end of the member 11 and a threaded adjusting bolt 18 is adjustably mounted through the bracket 17. The bolt 18 carries a bead 19 at its outer end and a suitable nut 20 which abuts the inner face of the bracket 17, as shown in Figure 2. A depending bracket 21 is carried by the casing 16 and a suitable nut 22 is fixed to the inner face of the bracket 21. The adjusting bolt 18 is threaded through the nut 22 so as to adjust and move the casing 16 longitudinally of the member 11 and track-ways 13 as the bolt 18 is rotated.

The casing 16 is provided with a pair of transversely extending elongated aligned slots 23 upon the top portion of the casing 16 and near one end thereof. Anchoring bolts 24 extend vertically through the apertures 23 and through the conventional apertures 25 at one end of the motor 26 to fit motors of various widths. Only the lower portion of the motor 26 has been shown since the invention herein described is not limited to any particular type of motor. The casing 16 is also provided with longitudinally extending elongated apertures or slots 27 which are located in transverse alignment, one slot or aperture 27 being located near each side of the casing 16. The inner edge of each aperture or slot 27 is provided with a plurality of parallel cuts 28 and the material between the cuts 28 is bent, tilted, inclined or downwardly bent to provide downwardly inclined tongues 29 along the inner edge of each aperture or slot 27.

A U-shaped clamping bolt 30 extends transversely under the upper face of the casing 16, as shown in Figure 4, and the bolt 30 is provided with upstanding ends 31 which extend through the aperture 27. A clamping plate 32 is carried by these upstanding ends 31 and is adapted to overhang a portion of the motor 26, as shown in Figures 2 and 4. Suitable wing-nuts 33 are carried by the ends 31 of the U-bolt 30 for clamping the plate 32 firmly in engagement with the motor 26.

It should be noted that the U-bolt 30 may be set in a vertical position, as shown in Figure 4, and in dotted lines in Figure 2, or it may be swung toward either side of the vertical axis thereof to clamp motors of various sizes in position. The U-bolt 30 is shown swung to a forward clamping position to clamp a relatively short motor in place. The transverse portion of the bolt 30 by fitting behind the inclined tongues 29, will be firmly anchored against sliding movement longitudinally of the slots 27 while at the same time clamping the motor in position, and while the upstanding ends 31 extend at an incline to the vertical axis of the U-bolt. The combination of the U-bolt 30 with the inclined tongues 29 which act as abutments for the U-bolts 30 provides an efficient means for reaching and clamping motors of various base lengths in position. The inclined tongues 29 provide fulcrums against which the U-bolt 30 may be pivoted.

From the foregoing description, it will be seen that a very simple and efficient means has been provided which may be easily adjusted to firmly clamp and support motors of various base lengths in position, thereby avoiding the necessity of providing a large number of supports, each of a different size or length.

It should be understood that certain detail changes may be made in the structure described, so long as these changes fall within the scope of the appended claims.

Having described the invention, what I claim is:

1. An adjustable motor base comprising a casing, a supporting portion, said casing having a plurality of aligned anchoring bolt-receiving slots located near one end thereof and extending transversely of said casing, motor-anchoring bolts passing through said slots, pivoted motor-anchoring means secured to said casing and mounted for forward and rearward swinging motion for adjustable clamping engagement with motors of various base lengths, and means engaging said pivoted motor-anchoring means for clamping the anchoring means in engagement with a motor base.

2. An adjustable motor base comprising a casing, a supporting portion, said casing having a plurality of aligned anchoring bolt-receiving slots located near one end thereof and extending transversely of said casing, motor-anchoring bolts passing through said slots, a U-shaped clamping bolt secured to said casing and mounted for forward and rearward swinging motion for adjustable clamping engagement with motors of various base lengths, a clamping member carried by said bolt, and clamping nuts carried by said bolt for clamping said member in engagement with a motor base.

3. An adjustable motor base comprising a casing, a supporting portion, said casing having a plurality of aligned anchoring bolt-receiving slots located near one end thereof and extending transversely of said casing, motor-anchoring bolts passing through said slots, a U-shaped clamping bolt secured to said casing and mounted for forward and rearward swinging motion for adjustable clamping engagement with motors of various base lengths, a clamping member carried by said bolt, clamping nuts carried by said bolt for clamping said member in engagement with a motor base, said casing having a plurality of laterally spaced longitudinally extending slots, said U-shaped bolt having a transverse portion extending under the upper face of the casing and a plurality of upstanding ends extending through said last-mentioned slots, said slots having abutments on edges thereof for receiving said transverse portion of said U-bolt to hold the upstanding ends of the U-bolt in an inclined position in a manner whereby the clamping member may engage motors of varying lengths to anchor the motor in position.

4. An adjustable motor base comprising a casing, a supporting portion, said casing having a plurality of aligned anchoring bolt-receiving slots located near one end thereof and extending transversely of said casing, motor-anchoring bolts passing through said slots, a U-shaped clamping bolt secured to said casing and mounted for forward and rearward swinging motion for adjustable clamping engagement with motors of various base lengths, a clamping member carried by said bolt, clamping nuts carried by said bolt for clamping said member in engagement with a motor base, said casing having a plurality of laterally spaced longitudinally extending slots, said U-shaped bolt having a transverse portion extending under the upper face of the casing and a plurality of upstanding ends extending through said last-mentioned slots, said slots having transversely slotted inner side edges defining inclined tongues for receiving said transverse portion of said U-bolt to hold the upstanding ends of the U-bolt in an inclined position in a manner whereby the clamping member may engage motors of varying lengths to anchor the motor in position.

WILLIAM J. BOYLE.

REFERENCES CITED

The following references are of record in the file of this patent:

UNITED STATES PATENTS

| Number | Name | Date |
|---|---|---|
| 1,756,515 | Hulsey | Apr. 29, 1930 |
| 2,118,085 | Helmond | May 24, 1938 |

FOREIGN PATENTS

| Number | Country | Date |
|---|---|---|
| 467,959 | Great Britain | June 25, 1937 |